United States Patent [19]

Christian et al.

[11] Patent Number: 4,589,141
[45] Date of Patent: May 13, 1986

[54] APPARATUS FOR AUTOMATICALLY INSPECTING PRINTED LABELS

[75] Inventors: Donald J. Christian, Richardson; Patrick A. Humm, McKinney, both of Tex.

[73] Assignee: Texas Instruments Incorporated, Dallas, Tex.

[21] Appl. No.: 588,484

[22] Filed: Mar. 12, 1984

[51] Int. Cl.$^4$ ............................................. G06K 9/62
[52] U.S. Cl. ..................................... 382/14; 209/524; 382/57
[58] Field of Search .................... 382/14, 57; 209/524; 235/437

[56] References Cited

U.S. PATENT DOCUMENTS

| | | |
|---|---|---|
| 3,430,766 | 3/1969 | Stone ................................... 209/524 |
| 3,676,645 | 7/1972 | Fickenscher et al. ................ 382/14 |
| 4,084,616 | 9/1977 | Hart et al. ............................. 382/14 |
| 4,160,901 | 7/1979 | Nakanishi et al. .................. 235/437 |
| 4,186,378 | 1/1980 | Moulton .............................. 382/56 |
| 4,504,970 | 3/1985 | Werth et al. ......................... 382/14 |

Primary Examiner—Leo H. Boudreau
Assistant Examiner—Joseph Mancuso
Attorney, Agent, or Firm—Alva H. Bandy; Leo N. Heiting; Melvin Sharp

[57] ABSTRACT

A computer vision apparatus for automatically inspecting printed labels is disclosed. A television type camera views a label under inspection and inputs an image thereof to a pattern recognition and analysis circuit for verification. A monitor with viewing screen, joystick and keypad is connected to the pattern recognition and analysis circuit for operator supervision of the system.

5 Claims, 5 Drawing Figures

APPARATUS FOR AUTOMATICALLY INSPECTING PRINTED LABELS

This invention relates to inspection systems and more particularly to an apparatus for automatically inspecting printed labels.

In the past apparatuses have been used for label reading without checking the content of the label for quality or content against a prototype label. If a human being performs the task the fatigue factor greatly reduces the effectiveness of people for this job; it is very difficult for anyone to verify marks accurately for more than a short period of time. Nevertheless, label verification continually grows in importance as factory automation becomes more pervasive.

Label verification is important both to outgoing and incoming warehousing operations and when a large number of physically similar parts are handled, their labels may be the only way of differentiating among them. For example, the labels may be the only way of differentiating bottles of pharmaceuticals, chemicals, blood samples, and semiconductor devices such as integrated circuits. Thus it is essential that the parts not only be verified as being correct but also legibly marked as they go out the door and recognizable as such at the receiving station.

Accordingly, it is an object of this invention to provide an apparatus for determining whether labels are upside down, clear and smudged.

Another object of the invention is to provide an apparatus for determining whether the markings or labels are correct.

A further object of the invention is to provide an apparatus for determining whether the label or marking is correctly positioned and oriented.

Yet another object of the invention is to provide an apparatus having a monitor for supervising the operation of the apparatus.

Briefly stated this invention comprises an apparatus for performing the automatic inspection of labels or marked manufactured products and verifying the correctness, orientation, and legibility of the label or marking. The apparatus includes a camera type viewing means for viewing the label or marking of a product and forming an electrical representation thereof for a pattern recognition and analysis circuit, and a monitor for monitoring the operation of the apparatus.

A detailed description of a preferred embodiment of this invention is made with reference to the drawings wherein:

FIG. 1 is an isometric view of the automatic label inspection system constituting the subject matter of this invention.

FIGS. 2a and 2b constitute a block type schematic diagram of the automatic label inspection system absent the joystick/keypad apparatus.

Figure 1:
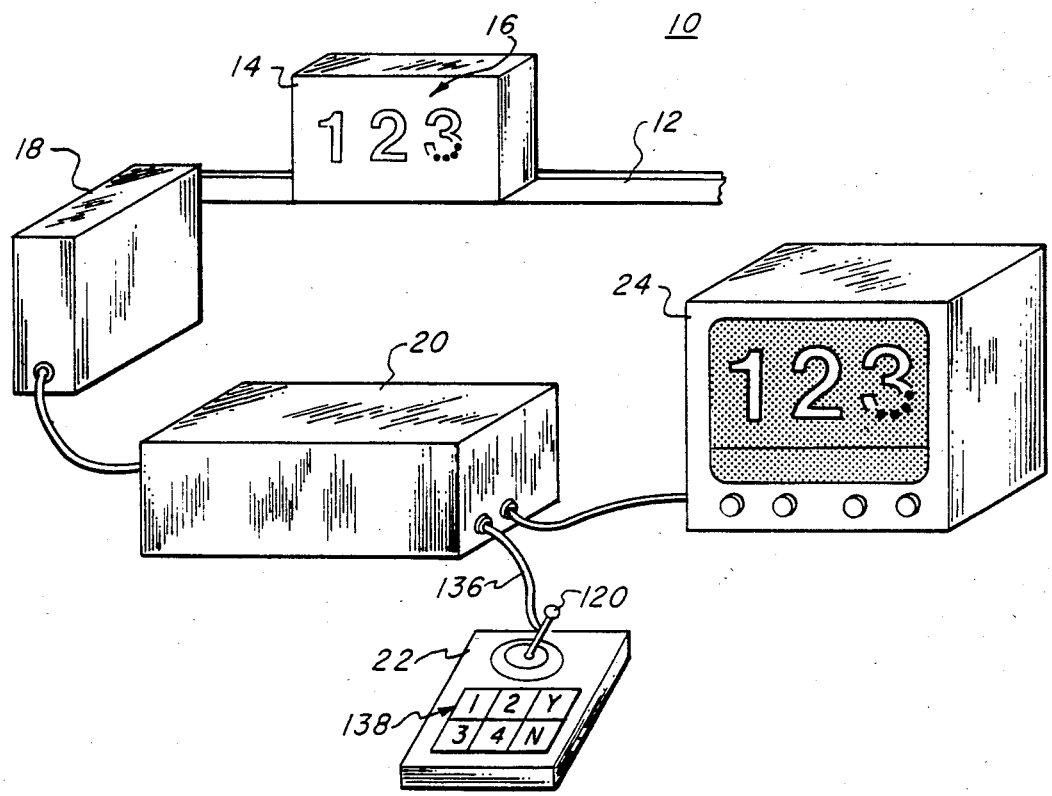

The computer vision system 10 (FIG. 1) for automatically inspecting printed labels includes a materials handling means 12 holding a labeled product 14 for inspection of its label 16. A camera means 18 such as, for example, a television camera is positioned in a picture taking relationship to the label for taking a picture of the label. A pattern recognition circuit 20 is connected to the television camera 18 for performing the label inspection, hereinafter described. A joystick/keypad 22 and a picture monitor 24 are connected to the pattern recognition set. The monitor 24 is for physically viewing the operation of the system; whilst the joystick/keypad 22 is for selecting training and other functions, hereinafter described, for the system for label inspection. The "training" or as it often called "teaching" process and a label inspection process will be described hereinafter.

CAMERA/PATTERN RECOGNITION AND ALALYSIS CIRCUIT/MONITOR

Figure 2A:
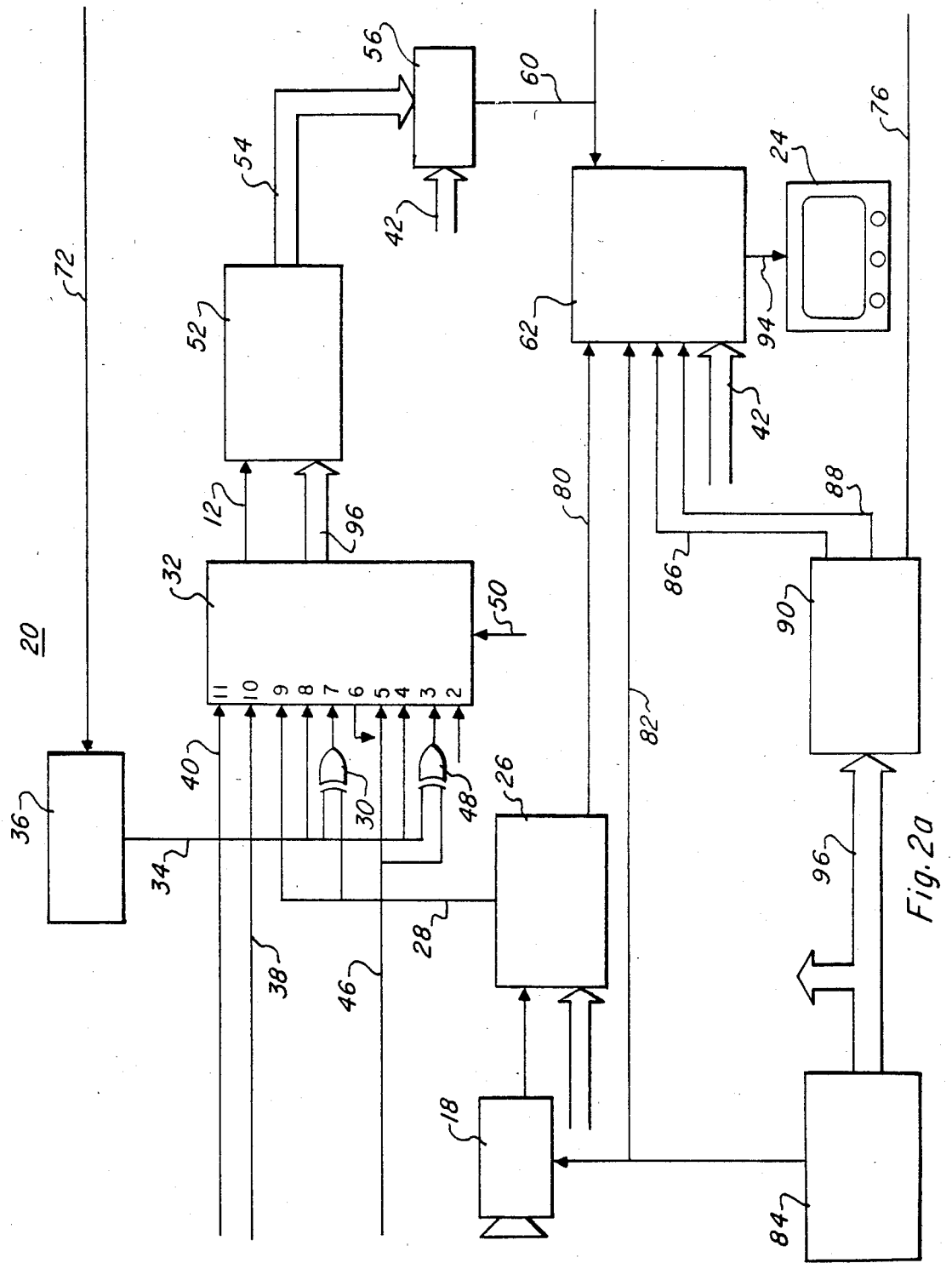
Figure 2B:
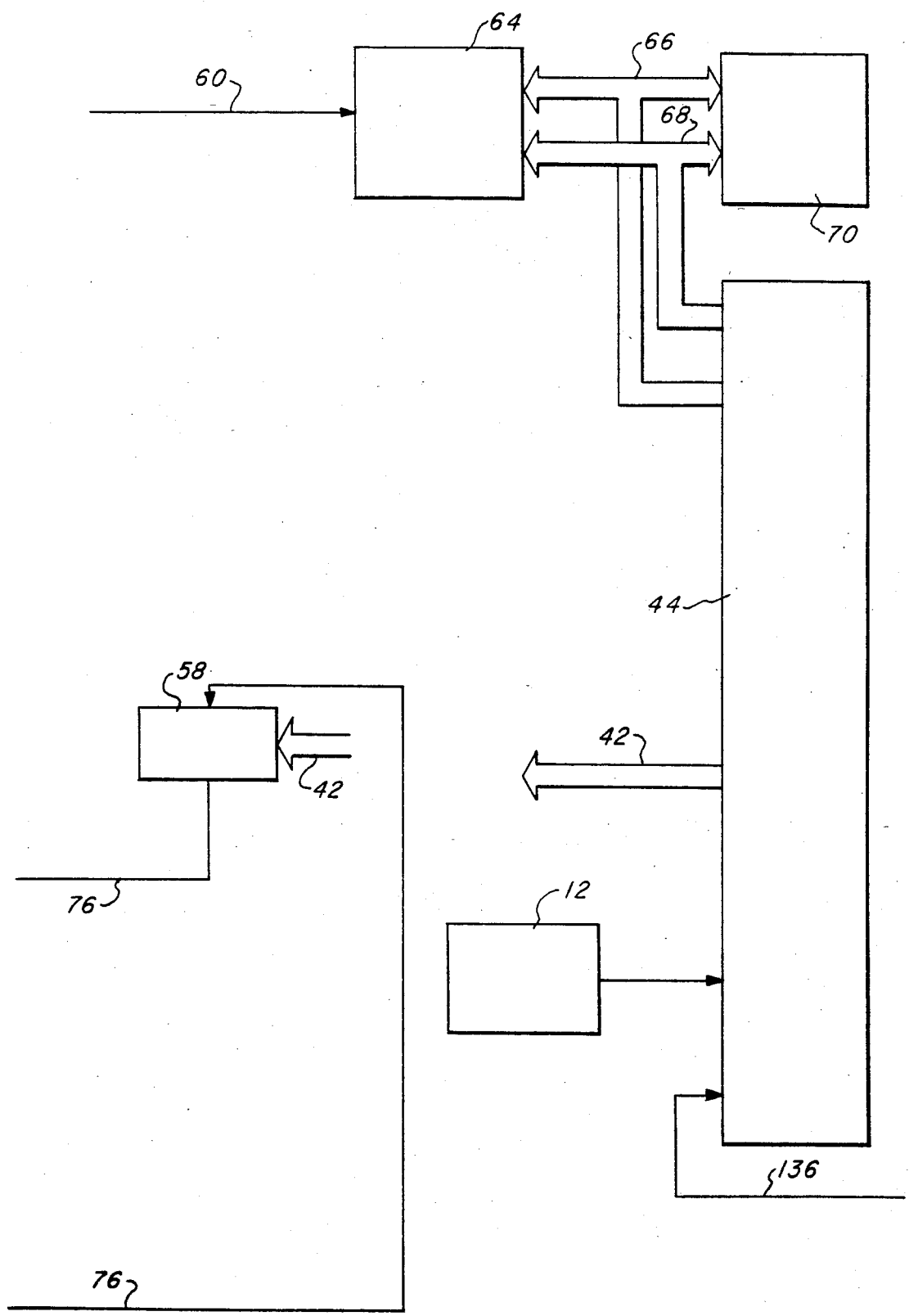

Referring now to FIGS. 2a and 2b, the pattern recognition and analysis circuit 20, (FIG. 2a) comprises a video input, threshold and comparator means 26 connected to the television camera 18 for receiving the analog horizontal and vertical scans. The horizontal scan, for example, consists of 256 rows and the vertical scan, for example, consists of 438 columns; thus, the picture includes, for example, 112, 128 picture elements (pixels).

The video input, threshold and comparator means 26 digitizes the video input into logic zeros ("0") for black and logic ones ("1") for white for producing a black and white digitized picture of the label. The video input threshold and comaprator 26 is connected by lead 28 to a first terminal of an exclusive OR gate 30 and to an input pin 9 of a selector 32. The other terminal of exclusive OR gate 30 and pin 8 of selector 32 are connected by lead 34 to a refresh buffer 36. The selector 32 has pins 10 and 11 connected by leads 38 and 40 to a data processor's Control Register Unit (CRU) out bus 42 (FIG. 2b) of a data processor 44 for selecting, respectively, the refresh buffer 36 input or the exclusive OR gate input.

It will be appreciated by those persons skilled in the art that a plurality of label inspection lines (applicant has used four) can be multiplexed from a four channel board on conductor 46 (FIG. 2a) to pin 5 of selector 32 and a first terminal of exclusive OR gate 48. A second terminal of exclusive OR gate 48 is connected by lead 34 to pin 4 of the selector 32 and to the refresh buffer 36. A strap selection for the four channel board is connected by lead 50 to pin 1 of selector 32 for selecting and controlling the camera input and corresponding refresh buffer. It will be understood that the four camera system and the one camera system described are either/or cases and a five camera system is not described by combining them.

The output pin 12 of selector 32 is connected to a two dimensional spatial low pass filter 52 which is, for example, a read only memory. The ROM 52 is connected by bus 54 to selector 56. Selector 56 is connected to the CRU out bus 42 (FIG. 2b) of data processor 44. The data processor sends operating signals selectively to activate the selector 56 (FIG. 2a) for purposes hereinafter described.

Selector 56 has its output connected by lead 60 to a video mixer and display control means 62 and to a direct memory access (read and write) logic means 64 (FIG. 2b). The direct memory access logic means 64 is connected by a data transceiver bus 66 to a data processor memory 70 and the data processor 44, and by an address transceiver bus 68 to the data processor memory 70 and data processor 44.

The direct memory access logic 64 has an output lead 72 connected to the refresh buffer 36 (FIG. 2a).

Selector 32 when it receives refresh buffer 36 input select control signals on pin 10 from the data processor inputs picture difference data into the two dimensional spatial low pass filter 52; the filtered data is output on bus 54 to selector 56 which is controlled by the CRU out bus 42 signals of data processor 44. A selector 58 (FIG. 2b) acts as a switch controlled by the CRU out 42 of data processor 44 to admit window forming signals received from a window generator 90 (FIG. 2a) on lead 76 to the video mixer and display control circuit 62 for highlighting a portion of the image on monitor 24. Monitor 24 may be, for example, a black and white television set.

The video mixer and display control 62 is connected: by lead 80 to the video input threshold and comparator means 26 for selectively receiving the analog video; by lead 82 to a clock synchronization and horizontal address generator 84 for receiving clock synchronization pulses; by leads 86 and 88 to the cursor and alpha stripe generator 90 for selectively receiving, respectively, cursor, and alpha stripe signals for the monitor and by the CRU out bus 42 for receiving input selection control signals from the data processor 44. The monitor 24 is connected by lead 94 to the video mixer and display control for receiving combined display video signals for display.

The clock synchronization, and horizontal address generator 84 provides synchronization signals to the camera 18 in addition to the synchronization pulses to the video mixer and display control 62, and horizontal address signals on bus 96 to the cursor and alpha stripe generator 90 and 2 dimensional spartial low pass filter (ROM) 52.

MATERIAL HANDLING

Figure 3:
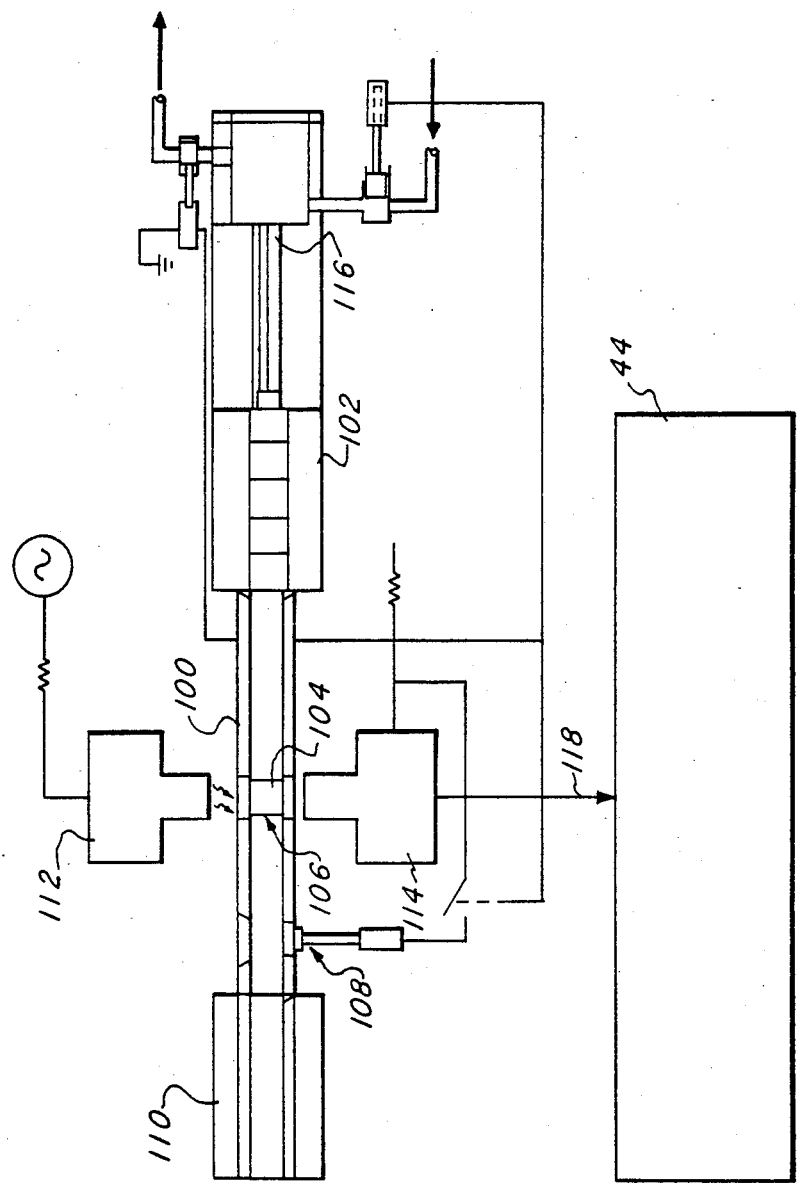
FIG. 3 is a top view of the material handling apparatus.

The material handling mechanism 12 (FIGS. 1, 2b and 3) includes a conveyor belt type elongated track means 100 (FIG. 3) having at a first end an article tray 102, and to the left thereof in serial order, an inspection station 104 having an article positioning guide means 106, an article rejector mechanism 108 and an article receiving tray 110 at a second end of the elongated track means. A light emitting diode 112 is positioned at the inspection station and a photoconductive cell 114 is positioned on the side opposing the LED of the inspection station. A pneumatically operated motor arm 116 is positioned adjacent the article tray 102. The pneumatic motor arm, light sensor, and article rejector are connected by transceiver lead 118 to the data processor 44 for input signals indicating an article is ready for inspection and output control signals for stepping movement of the articles through the inspection station and ejection station for ejection of the bad article or passage of the good articles on to the receiving tray.

In operation, at power "ON" with no article at the inspection station to break a beam of light emitted from the LED 112 to the light sensor 114, the data processor issues a control signal to the pneumatically driven motor arm 116 to move an article from the article tray 102 onto, for example, the conveyor belt type track 100 for transport to the inspection station's article positioning guide means 106. When the article is properly positioned at the inspection station 104 the light sensor is shielded from the light of the LED and the computer signals the conveyor belt type track to stop. Upon completion of the inspection process the microprocessor determines whether the article is to be rejected and the microprocessor signals the conveyor belt type track to step the article to the article rejector 108. If the article is to be rejected the computer activates the rejector 108 to eject the aricle from the track otherwise the track is stepped to the good article receiving tray 110 where the good article is stored.

JOYSTICK/KEYPAD

Figure 4:
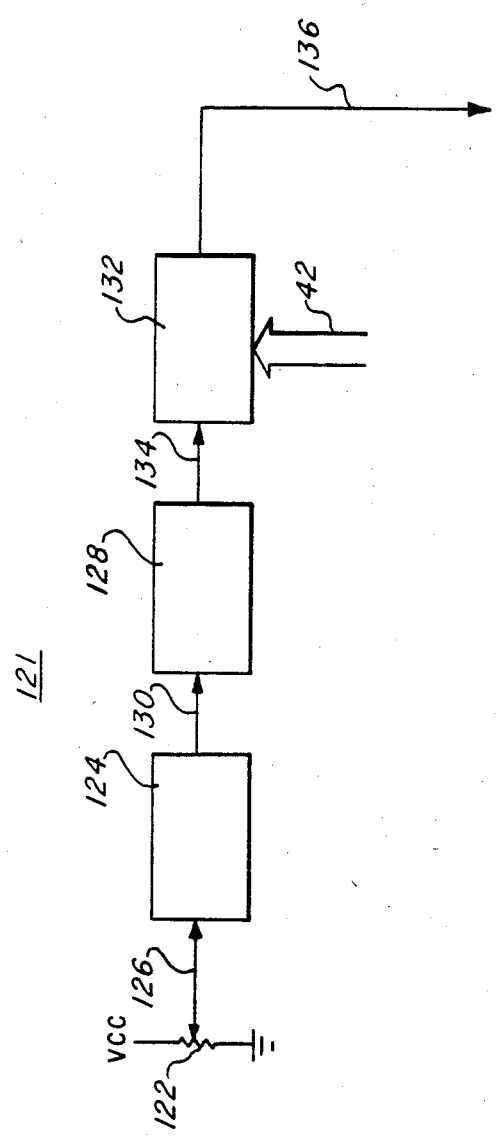
FIG. 4 is a block type schematic of the joystick and keypad circuit.

The joystick and keypad 22 FIGS. 1 and 4, includes a handle 120 (FIG. 1) operatively connected to a vertical and a horizontal cursor control circuit 122 (FIG. 4). As each channel is identical only one need be described. A potentiometer 122 has its arm mechanically connected to the joystick for varying the resistance of the potentiometer and voltage output. An analog to digital converter 124 is connected by lead 126 to receive and digitize the analog voltage output of the potentiometer. A latch 128 is connected by lead 130 to the A/D converter 124 to latch onto the digitized word output of the A/D converter 124. A decoder 132 is connected by lead 134 to the latch 128 to decode the output of the latch, into a binary code representative of one of, for example, 256 voltages. The decoder 132 is connected to the CRU out bus 42 (FIG. 2b) of the data processor 44 for receiving an enabling address. The output of the decoder 132 (FIG. 4) is connected to the CRU IN terminal by lead 136 for inputting the decoded signals into the data processor 44.

The keypad (FIG. 1) contains a plurality of function keys 138 including keys labeled 1–4, a yes key (Y) and a no key (N). The keys may be arranged in two rows of three keys each reading from left to right as follows 1, 2, Y and 3, 4, N. The keys are connected by lead 136 to the CRU IN terminal of the data processor 44.

The functions of the keys are as follows:
Key "1" is a reset key for stopping and resetting the operation cycle at any point;
Key "2" is a commence training key for use in starting the training (teach) cycle;
Key "3" is a set options key, when pressed the monitor asks for questions to be answered either yes or no by selectively pressing the "N" and "Y" key; and
Key "4" is a trial inspection key which may be pressed for a trial or test run after training the system.

The alpha stripe generator 90 generates the four set options key questions on the monitor which are:
(1) "Review training data?";
  (Display prototype images on monitor?);
(2) "Stop on rejects?";
(3) "Stop on all units?"; and
(4) "Reset counters?".

The first set option permits the operator to view the display prototype images on the monitor; the second set option permits the operator to review the rejected label on the monitor; the third set option stops all units for device inspection and the sums for each character to be displayed; and the fourth set option displays the total number of units inspected and the good/bad numbers.

LOW PASS FILTER

The low pass filter 52 which is, for example, a TI 74S472 read only memory (ROM) sold by Texas Instruments Incorporated is programmed to generate eight video processes as follows:

The first process selects the raw video on a one-to-one basis for label comparison.

The second process selects a smoothing process for removing video noise (fine grain) from the video prior to comparison.

The third process provides for edge detection only (blandness measurement).

The fourth through the eighth processes are for label inspection quality control selection. The video data is compared using a 3×3 array of binary numbers representing a 3×3 pixel array where a logic "1" represents a white pixel and a logic "0" represents a black pixel. The digit for the center pixel is compared with its eight neighbors. Assuming white ("1") is bad and black ("0") is good for:

The fourth process the quality is bad where four of eight neighbor digits are ones, otherwise the quality is good (zeros);

The fifth process five of eight is bad, otherwise good;

The sixth process six of eight is bad, otherwise good;

The seventh process seven of eight is bad, otherwise good; and

The eighth process eight of eight is bad, otherwise good.

OPERATION

In operation the system goes through first a teach phase in which a prototype label is memorized by the system and then through an inspection phase in which unknown labels are inspected by the system.

In the teach phase, a good sample of a labeled article 14 is selected by the operator and placed on the article support means 12. The support means positions the smaple in front of the television camera 18. The article 14 when so positioned breaks a light beam to notify the computer as to its presence and to activate the camera 18. The camera then scans the label and produces analog voltages representing the video information. The analog video information is input to the video input threshold and comparator 26 and through the video mixer and display control 62 to the monitor 24.

The monitor 24 provides the operator a visible representation of the label. If the quality of the video is good, that is, for example, smooth, process number 1 is selected by the computer program; but if the image quality is bad, that is, for example, fine grained or specked by a dirty lens, process number 2 is selected.

Simultaneously the analog video from the camera 18 is digitized in the video input threshold and comparator means 26. That is the shades of gray of the analog video signals are compared with a reference voltage and a logic "1" or logic "0" produced for the information of each pixel.

The digitized signals are selected by selector 32 for passage through the two dimensional spatial low pass filter 52 which is, for example, a read only memory controlled by the data processor to select a process from the eight processes above-mentioned. At this stage the process selected will be either the first or second process. If the first process is selected the digitized data is passed on a one-to-one basis through selector 56, repsectively, to the video mixer and display control 62 and through the direct memory access logic 64 into the pattern-recognition memory 70 for storage. The path is the same when process number 2 is selected, but the two dimensional spatial low pass filter 52 removes noise and unimportant high-spatial-frequency detail. The filter does this by comparing the center pixel to its eight neighbors, when all the digits but one is, for example, a zero (black) that one is rejected. In this manner isolated pixels are removed to provide a smooth, clean picture.

Finally the joystick 120 is manipulated to "grow" or define or highlight a rectangular window around each symbol of the label for forming a template thereof. Each window is displayed as a highlighted region (portion) on the display monitor 24. A graphical image of each rectangular image is then stored in the pattern recognition memory 70. Each symbol is erased from the display to indicate that it has been successfully stored. After all the symbols have been "taught" to the system, training integrity can be verified by trial inspections on both known and unknown articles using the keypad

INSPECTION PHASE

After the computer has been taught to recognize good labels, labeled products to be inspected are inserted into the automatic feed means and with the process number 1 or 2 selected the automatic feed means moves a labeled product into position at the inspection station. The positioned labeled product breaks the light beam to start the camera 18 and the video information is processed as described in the "teach" phase into the pattern recognition memory 70. The data processor using a two-dimensional correlation technique locates each digit in the label. Correlation techniques are widely used in the OCR (Optical Character Recognition) industry for alignment and classification. Through the correlation technique the digit under inspection is stepped through horizontal and vertical movements until a maximum correlation position is obtained.

After correlation the computer compares the digit under inspection to the prototype template of the window and generates a difference image for each character using an exclusive OR function on a pixel-by-pixel basis, i.e. "0" indicates similar pixels and a "1" indicates a difference and stores the difference image in memory 70. If no digit is located the process ends and the computer instructs the inspection station to reject the article.

Next the computer program notifies the two dimensional spatial LPF 52 of the process number selected from the fourth through the eighth process, switches the selector 32 to connect the refresh buffer 36 to the LPF 52, and then writes the difference image in 3×3 element arrays from the memory 70 through the refresh buffer 36 and selector 32 into the LPF 52.

The LPF 52 provides a good/bad signal for each array through selector 56 to the pattern recognition memory 70. Data processor 44 uses an adder to analyze each array output for each digit and outputs a total bad value for comparison with the whole number to determine the ratio of bad to the whole for grading. if the difference image is all zero (completely black) the inspected image matches the prototype, otherwise, if the bad to whole ratio exceeds a preselected value, e.g. 0.04 the computer instructs the inspection station to reject the article otherwise the article continues down the feed line and the computer is notified of the arrival of a new article at the inspection station and the cycle starts again.

Although preferred embodiments of the present invention have been described in detail, it is to be understood that various changes, substitutions, and alterations can be made therein without departing from the scope of the invention as defined by the appended claims.

What is claimed is:

1. An automatic printed label inspecting apparatus comprising a computerized vision system for selectively inspecting labels and labeled articles and rejecting articles having labels not meeting preselected visual requirements, said apparatus including:
   (a) an inspection station means for positioning labeled articles;
   (b) a camera means positioned at the inspection station for breaking down the image of the label into small picture elements (pixels) and converting each pixel into electrical analog signals representative of the light intensity thereof (video signals); and
   (c) a pattern recognition circuit means operatively connected to the camera means for receiving and processing the electrical signals representative of the pixels for selectively rejecting the labeled article; said pattern recognition circuit means having a digitizing circuit means operatively connected to the camera means, a selector means operatively connected to the digitizing circuit means, a memory means operatively connected to the selector means, a spatial low pass filter means operatively connected to the selector means and memory means, and a data processing means operatively connected to the selector means and memory means, said digitizing circuit means operatively connected to the camera means for receiving and digitizing the analog video signals of the camera means into digital signals representative of a picture for a reference label and for subsequent labels to be inspected, the selector means operatively connected to the digitizing circuit means, memory means, spatial low pass filter means and data processing means for selectively inputting the digitized reference label picture and subsequent digitized inspection label pictures sequentially into the memory means for comparison and generation of a digitized difference picture for each character of the label by the data processing means for storage in the memory means, and for inputting the difference picture in arrays of preselected size into the spatial low pass filter for selective comparison, the low pass filter connected to the data processing means for inputting selectively good and bad signals to the data processing means for use by the data processing means in making a good/bad decision.

2. An automatic printed label inspecting apparatus according to claim 1 wherein the pattern recognition circuit means further includes a refresh buffer means operatively connected to the memory means and selector means for periodic renewal of the data received from the memory means.

3. An automatic printed label inspecting apparatus according to claim 1 wherein the pattern recognition circuit means further includes a video mixer and display control circuit means having inputs operatively connected to the digitizing circuit, means, spatial low pass filter and data processing means and an output terminal for connection to a monitor for selectively outputting video signals representative of the label inspection operation.

4. A method for insepcting labels on a labeled article consisting of the steps of a computer/vision teaching process for developing a digitized video reference image of a label and a computer/vision inspection process for developing a digitized video inspection image of a label and processing the resulting images for grading the inspected labels, wherein said steps include;
   (a) placing a reference label before a camera means for producing analog video signals representative of the pixels of the reference label;
   (b) viewing the video picture on a monitor for determining the quality of the label image:
   (c) selecting a process for label inspection selectively on a one-to-one raw video basis and on a smoothed process basis for removing video prior to comparison;
   (d) digitizing the analog video into black and white indicating logic signals;
   (e) filtering the digitized video signals for passing the video signals selectively on a one-to-one raw data basis and on a smoothed basis;
   (f) storing the filtered digitized video in memory;
   (g) highlighting a portion of the image on the monitor around each symbol of the label; and
   (h) storing a graphical image of each portion of the image in the memory.

5. A method for inspecting labels on a labeled article according to claim 4, wherein the inspection step consists of the steps of:
   (a) placing an inspection label before a camera means for producing analog video signals representative of the pixels of the inspection label;
   (b) digitizing the analog video into black and white indicating logic signals;
   (c) filtering the digitized video signals for selectively passing the video signals on a one-to-one raw data basis and on a smoothed basis;
   (d) correlating the filtered digitized video signals for locating each character in the label;
   (e) comparing each character of the inspection label with the corresponding character of the reference label and generating a character difference image;
   (f) selectively rejecting the label if no character image is found and filtering the character difference image on a preselected pixel size array by array basis for selectively determining the good and bad array;
   (g) adding the number of good and bad arrays for each character and;
   (h) rejecting each label having a character whose ratio of the number of bad arrays to the total number of arrays exceeds a preselected value.

* * * * *